United States Patent [19]
Yagi

[11] Patent Number: 6,000,267
[45] Date of Patent: Dec. 14, 1999

[54] PROCESS FOR FABRICATION OF RACK SHAFT AND FABRICATION MACHINE THEREFOR

[75] Inventor: Tadashi Yagi, Kashihara, Japan

[73] Assignee: Koyo Seiko Co., Ltd., Osaka, Japan

[21] Appl. No.: 09/028,047

[22] Filed: Feb. 23, 1998

[30] Foreign Application Priority Data

Feb. 25, 1997 [JP] Japan ................................. 9-058513

[51] Int. Cl.⁶ .................................................. B21B 21/00
[52] U.S. Cl. ............................ 72/189; 72/207; 72/370.21
[58] Field of Search .......................... 72/370.16, 370.19, 72/370.2, 370.21, 189–193, 207, 406

[56] References Cited

U.S. PATENT DOCUMENTS

| | | | |
|---|---|---|---|
| 2,291,408 | 7/1942 | Pearson | 72/189 |
| 3,193,659 | 7/1965 | Schaus | 72/191 |
| 4,100,785 | 7/1978 | Bishop | 72/189 |
| 4,573,399 | 3/1986 | Wilson . | |
| 4,598,451 | 7/1986 | Ohki | 72/370.21 |
| 4,646,554 | 3/1987 | Wallis et al. | 72/406 |
| 4,651,551 | 3/1987 | Bishop et al. | 72/189 |
| 5,546,781 | 8/1996 | Krapfenbauer | 72/190 |
| 5,628,222 | 5/1997 | Yasuda et al. | 72/370.19 |
| 5,722,281 | 3/1998 | Yasuda et al. | 72/192 |

FOREIGN PATENT DOCUMENTS

| | | |
|---|---|---|
| 10 24 477 | 2/1958 | Germany . |
| 55-042151 | 3/1980 | Japan . |
| 60-221143 | 11/1985 | Japan . |
| 61-088938 | 5/1986 | Japan . |
| 03-032819 | 2/1991 | Japan . |
| 5-88662 | 4/1993 | Japan . |
| 05-305309 | 11/1993 | Japan . |
| 05-329513 | 12/1993 | Japan . |
| 06-182472 | 7/1994 | Japan . |
| 1547892 | 3/1990 | U.S.S.R. .................................. 72/189 |
| 23124 | 8/1915 | United Kingdom . |
| 1462429 | 1/1977 | United Kingdom . |

OTHER PUBLICATIONS

European Search Report, dated Feb. 2, 1999.

*Primary Examiner*—Joseph J. Hail, III
*Assistant Examiner*—Ed Tolan
*Attorney, Agent, or Firm*—Thelen Reid & Priest

[57] ABSTRACT

A steel pipe having a circular sectional form is retained by a retainer. A rotatable first roller is pressed against an intermediate portion of the steel pipe. In this state, a pusher causes the steel pipe to move axially of the steel pipe. This causes the steel pipe to be plastically deformed while maintaining the first roller in rolling contact with the steel pipe whereby a flat portion is formed at the intermediate portion of the steel pipe. Subsequently, a second roller for forming rack teeth which is formed with teeth at its outer periphery is pressed against the flat portion of the steel pipe while the steel pipe is relatively moved in the axial direction thereof. This causes the flat portion of the steel pipe to be plastically deformed for formation of rack teeth at the flat portion.

7 Claims, 14 Drawing Sheets

PROCESS FOR FABRICATION OF RACK SHAFT AND FABRICATION MACHINE THEREFOR

BACKGROUND OF THE INVENTION

The present invention relates to a process for fabrication of rack shaft for use in steering gears for vehicles and a fabrication machine therefor.

There have conventionally been provided rack and pinion steering gears as the steering units for vehicles. The rack and pinion steering gear is arranged such that a pinion is meshed with rack teeth cut on a rack shaft so as to axially move the rack shaft as rotated by the operation of a steering wheel, thereby allowing the steering of a vehicle.

As shown in FIGS. 12 and 13, the rack shaft for use in such a rack and pinion steering gear is formed of a steel pipe P for weight reduction. The steel pipe P is cut with rack teeth 90 at its axial intermediate portion, which rack teeth are meshed with the pinion. The rack teeth 90 are formed by a process comprising the steps of working a flat portion 92 by plastically deforming a part of the steel pipe P with an arcuate portion 91 thereof kept intact, and subjecting the flat portion 92 to a gear cutting work. The rack teeth 90 portion is hardened to a predetermined hardness by means of induction hardening.

As a process for forming the above flat portion 92 of the rack shaft, press forming is generally adopted wherein as retained by a die 93 including an upper die 93a and a lower die 93b, the steel pipe P is pressed by a forming punch 94 having a flat bottom surface, as shown in FIGS. 14 and 15. Unfortunately, however, this process produces sudden plastic deformation of the steel pipe P and therefore, dent-like deformations tend to occur at places axially and peripherally central of the flat portion 92, as shown by two-dot chain lines in the figures, or cracks tend to occur at places subject to a great quantity of deformation, such as inside corner portions Pa where an inner side of the flat portion 92 joins with an inner side of the arcuate portion 91.

To overcome this drawback, a work process has been proposed such that a bar-like jig 95 slantly positioned relative to the axis of the steel pipe P is pressed against the steel pipe P and, in this state, the jig is moved axially of the steel pipe P for forming the flat portion 92 (see Japanese Examined Patent Publication No. 5(1993)-88662).

However, the process utilizing the bar-like jig 95 has a problem that the jig 95 and the steel pipe P are in sliding contact under a great pressure and therefore, frictional resistance during the sliding movement may sometimes cause the both to seize up despite lubrication. Accordingly, there exists a need for preliminarily subjecting the steel pipe P to a lubrication process, such as bonderlube, for prevention of the occurrence of the aforesaid seizing. This results in an increased production cost.

OBJECT AND SUMMARY OF THE INVENTION

It is therefore, an object of the present invention to provide a process for fabrication of rack shaft and a fabrication machine therefor negating the need for the lubrication process for the steel pipe and offering a high precision forming of the flat portion free from cracks.

A process for fabrication of rack shaft according to the invention comprises a step wherein a first roller for forming a flat portion is pressed against an intermediate portion of a steel pipe having a circular sectional form and in this state, a relative movement axially of the steel pipe is caused between the first roller and the steel pipe with the first roller kept in rolling contact with the steel pipe whereby a flat portion is formed through plastic deformation in the steel pipe.

According to this process for fabrication of rack shaft, a part of the steel pipe is plastically deformed into the flat portion while the first roller is maintained in rolling contact with the steel pipe. Hence, the frictional resistance therebetween during the sliding movement can be minimized. This negates the need for the lubrication of the steel pipe for the purpose of preventing the first roller and the steel pipe from seizing up, although the prior art process requires such lubrication. Furthermore, since the plastic deformation of the steel pipe progressively proceeds along the axial direction thereof, the occurrence of dent-like deformation in the flat portion and of cracks in a portion subject to great deformation is prevented, which defects are incident to the press forming work.

According to a preferred mode of the invention, a process for fabrication of rack shaft is characterized in that the first roller is rotated in synchronism with the relative movement between the steel pipe and the first roller. This mode is effective to prevent the occurrence of slip between the steel pipe and the first roller during the relative movement therebetween, thus providing a more effective prevention of the seizing of the steel pipe and first roller.

According to another preferred mode of the invention, a process for fabrication of rack shaft further comprises a step wherein, subsequent to the formation of the flat portion in the steel pipe, a second roller for forming rack teeth which is formed with teeth at its outer periphery is pressed against the flat portion of the steel pipe and in this state, a relative movement axially of the steel pipe is caused between the steel pipe and the second roller so that, as kept rotated, the second roller plastically deforms the flat portion of the steel pipe for formation of rack teeth thereat.

This mode of the invention utilizes the second roller for plastically deforming the flat portion for formation of the rack teeth thereat and therefore, the formation of the rack teeth is not affected by residual stress produced in the flat portion during the formation of the flat portion through plastic deformation. This provides for a high precision forming of the rack teeth.

According to yet another preferred mode of the invention, a process for fabrication of rack shaft further comprises a step wherein, subsequent to the formation of the flat portion in the steel pipe, the flat portion of the steel pipe is subject to press forming by using a rack teeth forming die for formation of the rack teeth at the flat portion.

This mode of the invention is also adapted to plastically deform the flat portion for forming the rack teeth at the flat portion and therefore, the formation of the rack teeth is not affected by the residual stress in the flat portion. Thus is provided a high precision forming of the rack teeth.

A fabrication machine for rack shaft according to the invention comprises a retainer for retaining a steel pipe having a circular sectional form, a first roller for forming a flat portion which is rotatable and to be pressed against an intermediate portion of the steel pipe, and moving device for causing a relative movement between the steel pipe and the first roller in an axial direction of the steel pipe with the first roller pressed against said steel pipe, so that a part of the steel pipe is plastically deformed into the flat portion while the first roller is maintained in rolling contact with the steel pipe.

According to this fabrication machine for rack shaft, the first roller is pressed against the steel pipe retained by the retainer while the moving device causes the relative movement between the first roller and the steel pipe in an axial direction of the steel pipe so that the first roller may plastically deform a part of the steel pipe into the flat portion, as maintained in rolling contact with the steel pipe. This minimizes a frictional resistance between the steel pipe and the first roller sliding thereon, thus negating the need for lubricating the steel pipe for prevention of the seizing of the both. Hence, the production cost for the rack shaft is reduced. Additionally, the machine is adapted to progressively cause the plastic deformation of the steel pipe so that the occurrence of dent-like deformation in the flat portion and cracks in a portion of a great quantity of deformation can be prevented, although such defects are incident to the press forming work.

A fabrication machine for rack shaft according to a preferred mode of the invention further comprises a roller drive for rotating the first roller in synchronism with the relative movement between the steel pipe and the first roller. This mode is effective to prevent the occurrence of slip between the steel pipe and the first roller during the relative movement therebetween. Thus is provided a more effective prevention of the seizing of the steel pipe and the first roller.

A fabrication machine for rack shaft according to another preferred mode of the invention is characterized in that the roller drive includes a rack integrally formed with the retainer and extended in parallel with the axis of the steel pipe, and a pinion coupled to a support shaft of the first roller for integral rotation therewith and meshed with the rack.

According to this mode, the movement of the steel pipe can be linked to the rotation of the first roller by means of the rack and pinion. This allows one drive source to be shared by the moving device and the roller drive. Hence, the structure of the fabrication machine is simplified and the cost therefor is reduced.

A fabrication machine for rack shaft according to still another preferred mode of the invention is characterized in that the first roller includes a base portion fitted around the support shaft, and a fan-like forming portion protruding from an outer periphery of the base portion and having a circumferential length substantially equal to the overall length of the flat portion.

According to this mode, the rotating first roller presses the forming portion into a surface portion of the steel pipe thereby plastically deforming a part of the steel pipe into a flat face. Since the first roller is pressed in the surface portion of the steel pipe, there is not required a mechanism for varying a relative distance between the first roller and the steel pipe. Consequently, the structure of the machine is simplified.

DETAILED DESCRIPTION OF THE PREFERRED EMBODIMENTS

The present invention will hereinbelow be described with reference to the accompanying drawings illustrating the preferred embodiments hereof.

Figure 1:
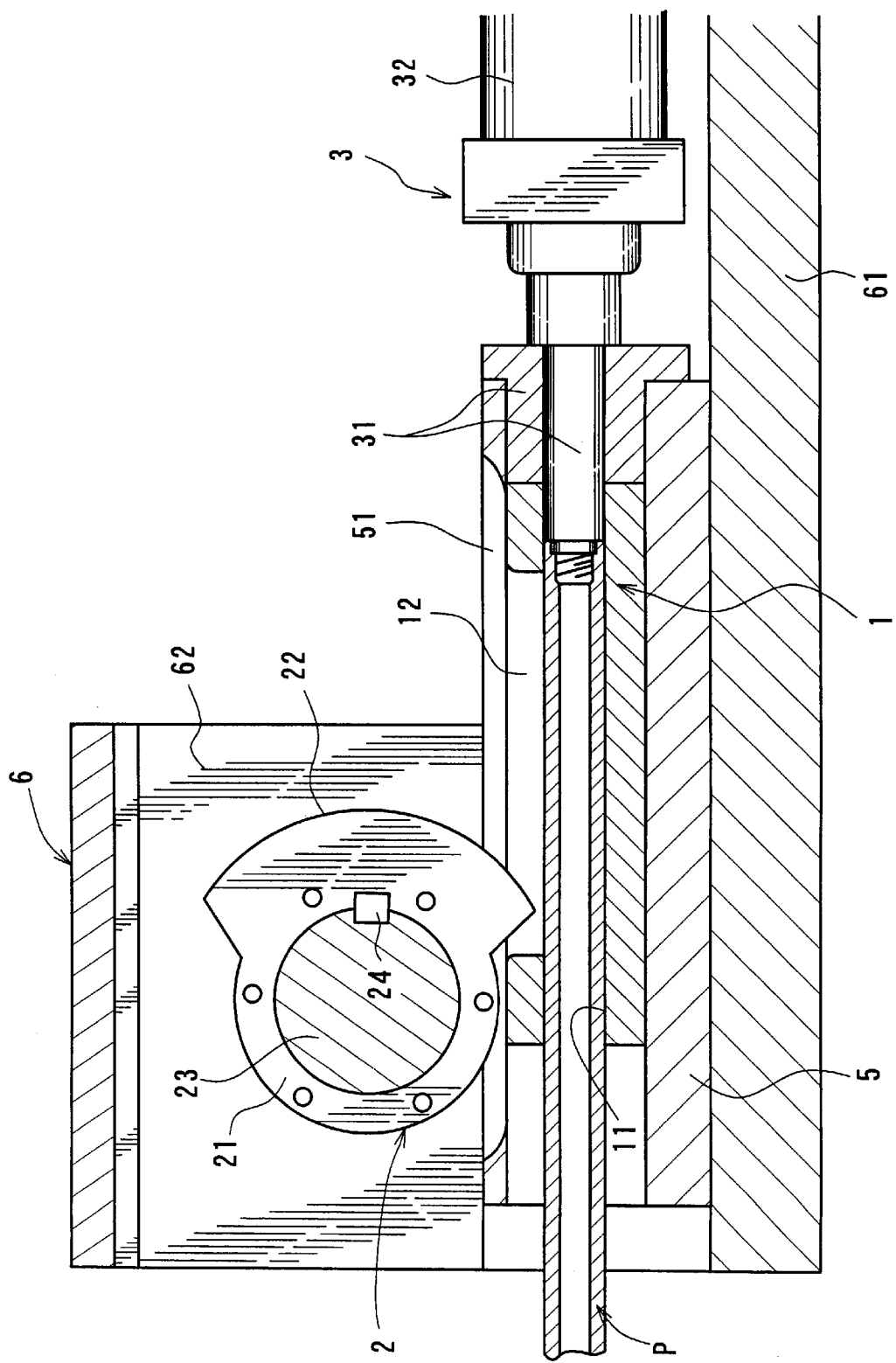
FIG. 1 is a vertical sectional view showing a fabrication machine for rack shaft according to an embodiment of the invention.
Figure 2:
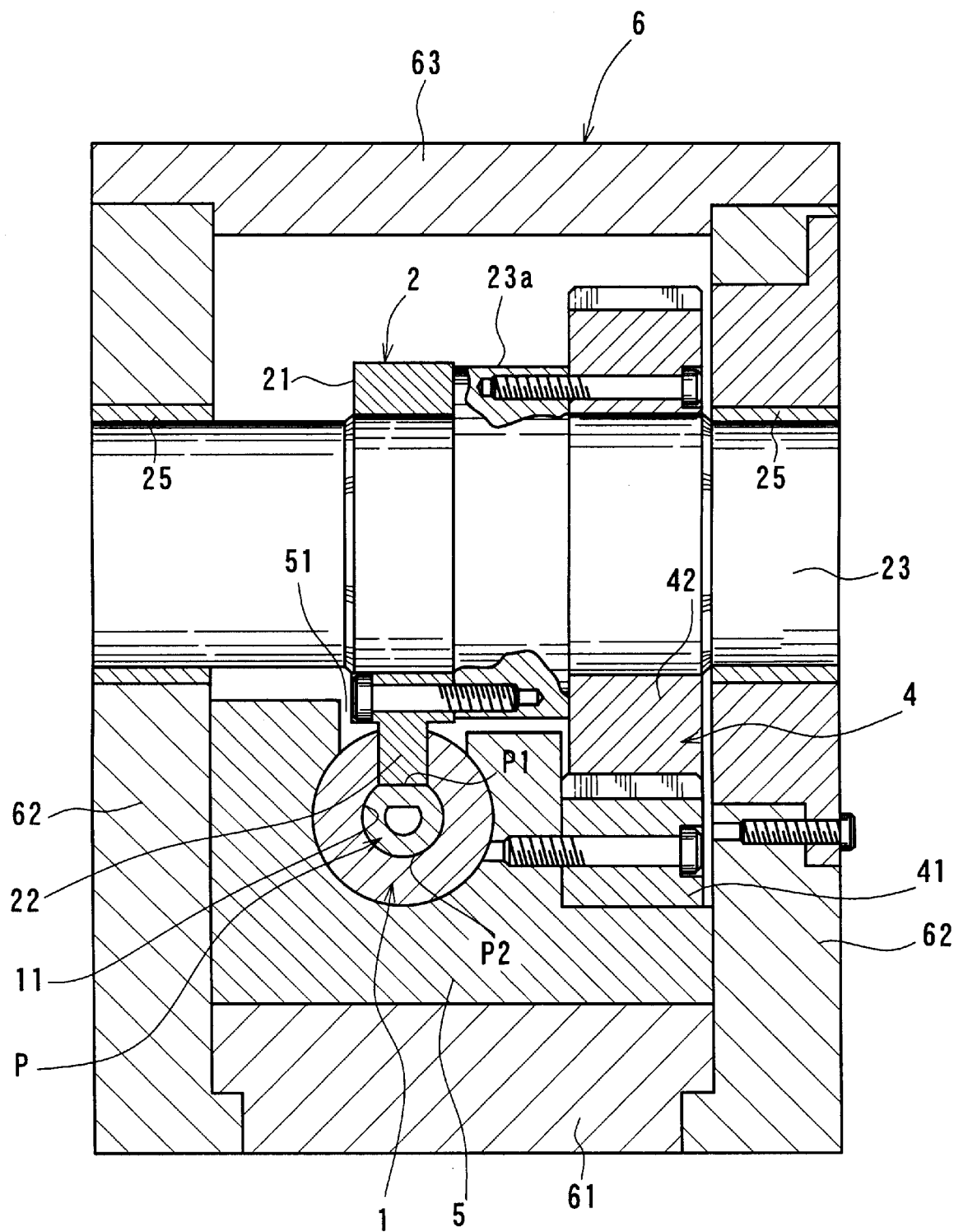
FIG. 2 is a horizontal sectional view showing the fabrication machine for rack shaft.
Figure 4:
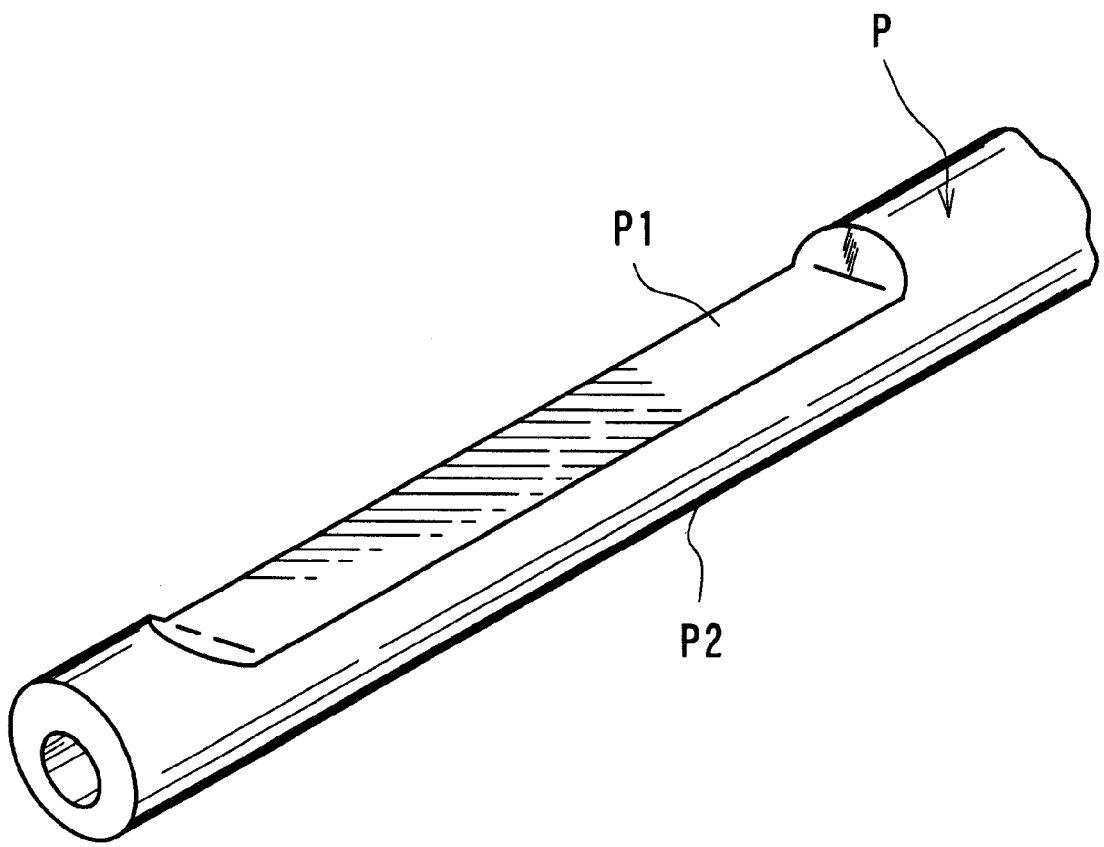
FIG. 4 is a perspective view showing a steel pipe formed with a flat portion.

FIG. 1 is a vertical sectional view showing a fabrication machine for rack shaft according to the invention whereas FIG. 2 is a horizontal sectional view showing the same. The fabrication machine for rack shaft is adapted to cause plastic deformation of an axially intermediate portion of a steel pipe P with a circular sectional form for forming a flat face thereat, so that the part of the steel pipe may have a D-shaped sectional form (see FIG. 4). The fabrication machine essentially comprises a retainer 1 allowing the steel pipe P to be inserted therein for retention thereof, a first roller 2 to be pressed against the intermediate portion of the steel pipe P for forming a flat portion thereat, a pusher 3 as moving device for causing a relative movement between the steel pipe P and the retainer 1 in an axial direction of the steel pipe P with the first roller 2 pressed thereagainst, a roller drive 4 for rotating the first roller 2 in synchronism with the movement of the steel pipe P, a slider 5 for supporting the retainer 1, and a frame 6 for integrally housing the above components.

The retainer 1 is shaped like a cylinder having an insertion hole 11 allowing for the insertion of the steel pipe P. Formed at a top portion of the retainer 1 is an elongate opening 12 for introduction of the first roller 2. The elongate opening 12 has an axial length somewhat greater than the overall length of a flat portion P1 of the steel pipe P, and a width substantially equal to that of a forming portion 22 of the first roller 2, which forming portion will be described hereinbelow. The insertion hole 11 has an inside diameter substantially equal to an outside diameter of the steel pipe P.

The retainer 1 is integrally formed with the slider 5 as restricted in its axial movement. The slider 5 is retained by a bottom plate 61 and a pair of side plates 62 of the frame 6 as allowed for sliding movement axially of the steel pipe P. Formed at a top of the slider 5 is an opening 51 for introduction of the first roller 2. The side plates 62 of the frame 6 are coupled to each other by means of the bottom plate 61 and a top plate 63.

The first roller 2 for forming the flat portion comprises an annular base portion 21 fitted around a support shaft 23, and a fan-like forming portion 22 protruding from an outer periphery of the base portion 21. The base portion 21 is bolted to a great diameter portion 23a of the support shaft 23. The base portion 21 is adapted to rotate integrally with the support shaft 23 by means of a key 24 fittedly interposed between the base portion and the support shaft 23.

The forming portion 22 has a circumferential length substantially equal to the overall length of the flat portion P1 of the steel pipe P and a width substantially equal to that of the flat portion P1. The forming portion 22 is introduced in the elongate opening 12 of the retainer 1 and is adapted to advance its outer periphery into the insertion hole 11 of the retainer 1 by a predetermined amount.

The support shaft 23 is rotatably supported by the pair of side plates 62 of the frame 6 by means of a slide bearing 25.

The pusher 3 comprises an abutment portion 31 abutted against one end surface of each of the slider 5, the retainer 1 and the steel pipe P retained by the retainer 1, and a hydraulic cylinder 32 for pushing the slider 5, retainer 1 and steel pipe P at a time via the abutment portion 31. The pusher 3 is adapted to move the retainer 1 by a distance equivalent to the overall length of the flat portion P1 of the steel pipe P.

Figure 3:
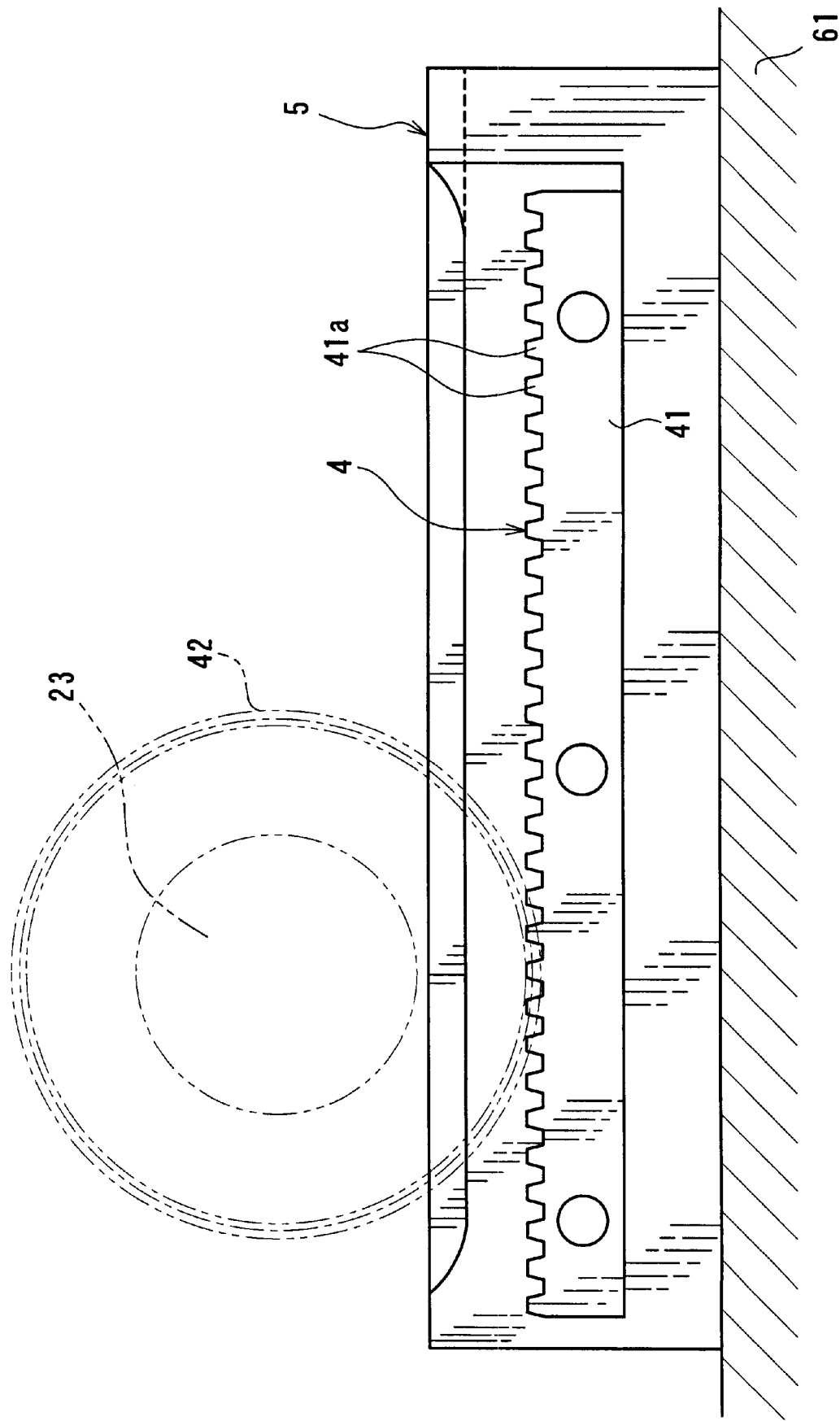
FIG. 3 is an essential sectional view showing the fabrication machine for rack shaft.

The roller drive 4 comprises a rack 41 bolted to the slider 5, and a pinion 42 meshed with this rack 41. The rack 41 extends in parallel to the axis of the steel pipe P with its rack teeth 41a oriented upward (see FIG. 3). The rack 41 has a greater overall length than that of the flat portion P1 of the steel pipe P.

The pinion 42 is bolted to the great diameter portion 23a of the support shaft 23. The pinion 42 is adapted to rotate integrally with the support shaft 23 by means of a key (not shown) fittedly interposed between the support shaft 23 and the pinion. This allows the movement of the slider 5 caused by the pusher 3 to be linked with the rotation of the first roller 2 via the pinion 42 and the support shaft 23. A pitch radius of the pinion 42 coincides with a radius of the forming portion 22 of the first roller 2 whereby the movement of the slider 5 is synchronized with the rotation of the first roller 2. Since the roller drive 4 is adapted to rotate the first roller 2 in linkage with the movement of the slider 5, a drive source intended to drive the first roller 2 is not required. Accordingly, the structure of the machine is the more simplified, resulting in cost reduction.

It is to be noted that the forming portion 22 of the first roller 2 is retracted from the insertion hole 11 of the retainer 1, which is moved to a home position (at the right end, as seen in FIG. 1), so that the steel pipe P can be readily inserted in the retainer 1.

Now, description will be made on a process for forming the flat portion P1 in the steel pipe P by the use of the fabrication machine for rack shaft of the above structure.

Referring to FIG. 1, with the retainer 1 moved to the home position, the steel pipe P is inserted in the insertion hole 11 of the retainer 1 so as to be set in place.

Figure 5:
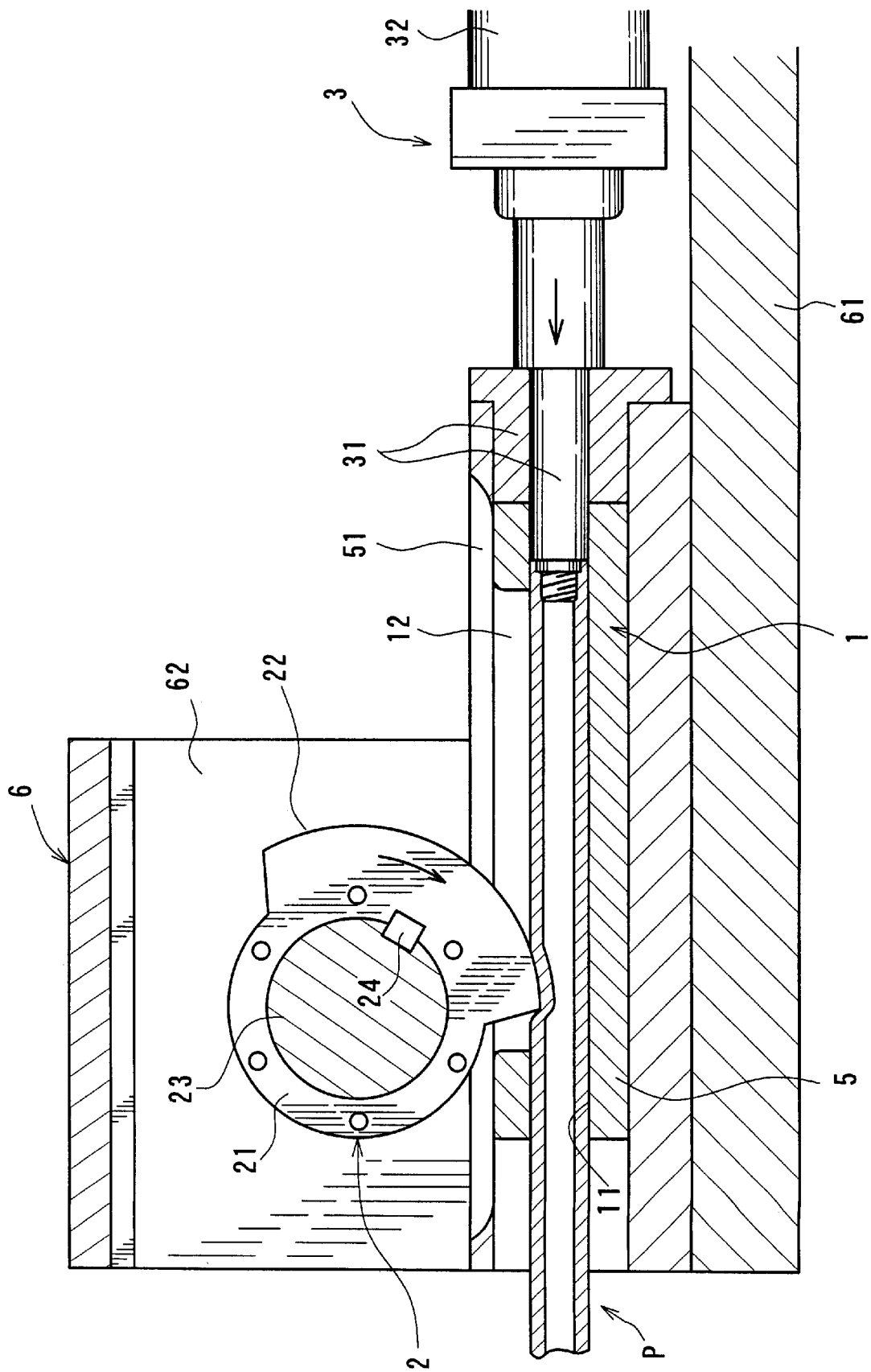
FIG. 5 is a vertical sectional view showing a state in which the flat portion is being formed.
Figure 6:
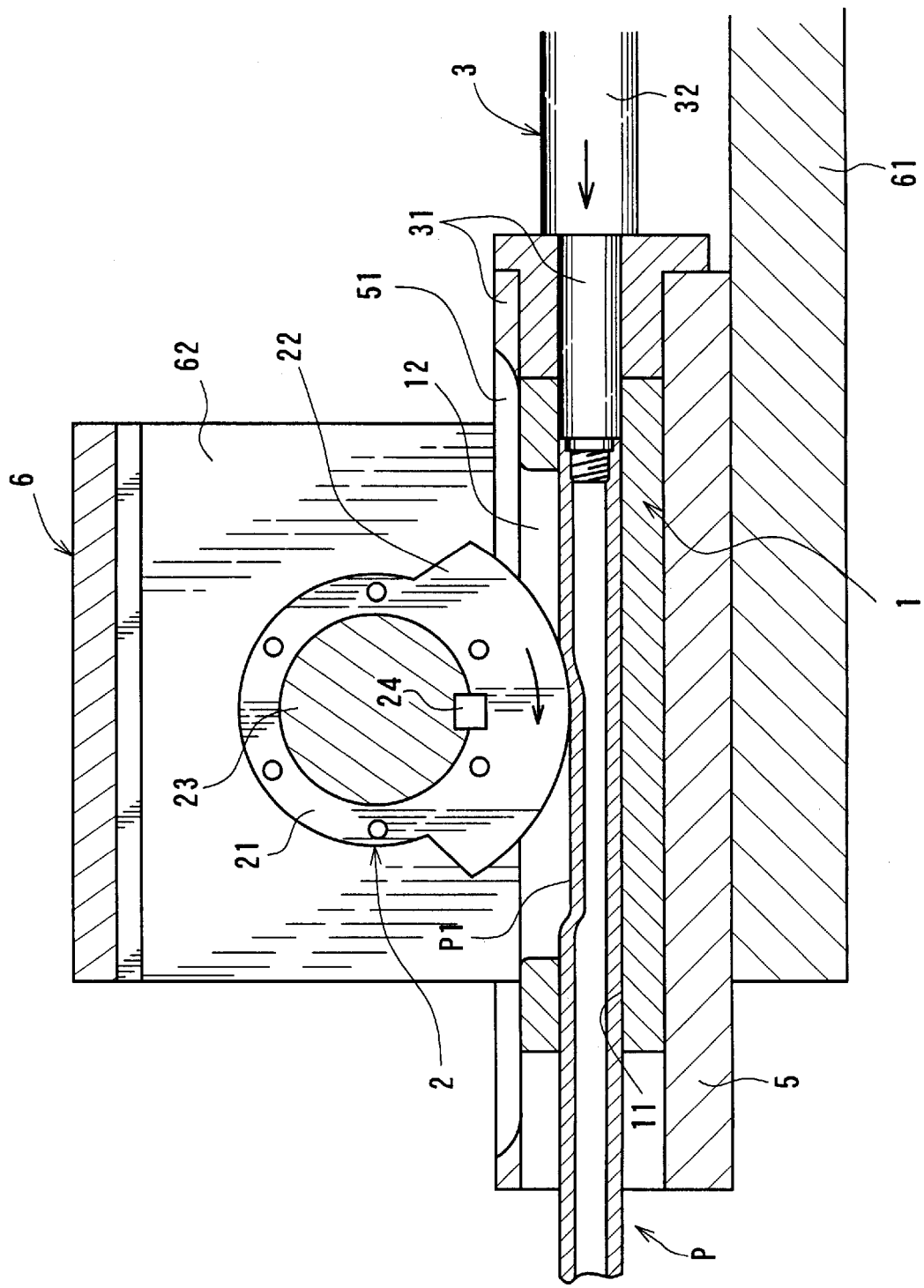
FIG. 6 is a vertical sectional view showing another state in which the flat portion is being formed.
Figure 7:
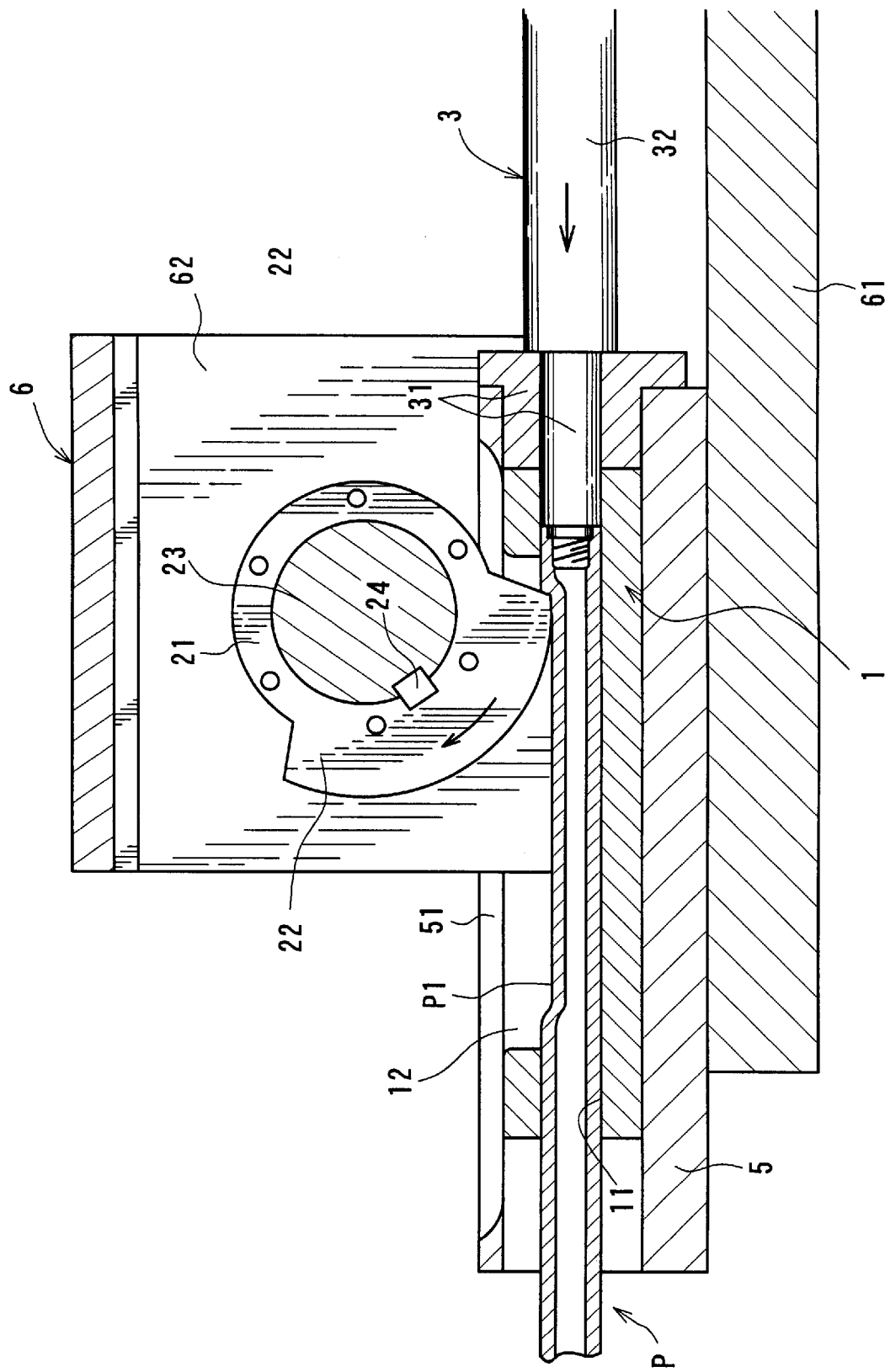
FIG. 7 is a vertical sectional view showing a state of the completed flat portion.

Subsequently, a hydraulic cylinder 32 of the pusher 3 is driven so as to move the steel pipe P together with the retainer 1 and the slider 5 leftward as seen in FIG. 1. Responding to this, the roller drive 4 rotates the first roller 2 clockwise, as seen in the figure, in synchronism with the movement of the steel pipe P. This allows the first roller 2 to press an outer peripheral edge of the forming portion 22 thereof into a surface portion of the steel pipe P by a predetermined amount (see FIG. 5). In this state, as associated with the steel pipe P continuing to be moved in the same direction as the above, the forming portion 22 progressively causes plastic deformation of a part of the steel pipe P as staying in rolling contact therewith (see FIG. 6), thereby finally forming the flat portion P1 having a length corresponding to a circumferential length of the forming portion 22 (see FIG. 7).

In this manner, the forming portion 22 of the first roller 2 plastically deforms a part of the steel pipe P into the flat face as staying in rolling contact with the steel pipe P and therefore, frictional resistance between the steel pipe P and the first roller 2 sliding thereon can be reduced to a substantially negligible level. This provides for the prevention of seizing of the steel pipe P and first roller 2 and therefore, preliminary lubrication of the steel pipe P is not required.

In addition, the roller drive 4 forces the first roller 2 into rotation in synchronism with the movement of the steel pipe P so that the occurrence of slip between the steel pipe P and the first roller 2 during the movement thereof may be effectively prevented. This leads to a more effective prevention of the seizing of the steel pipe P and the first roller 2 as well as a smooth finishing of the surface of the flat portion P1.

Further, since the plastic deformation of the steel pipe P progressively proceeds in the axial direction thereof, the occurrence of a dent-like deformation in the flat portion P and of cracks in a portion of an inner periphery of the steel pipe P at which the flat portion P1 joins with the arcuate portion P2 is prevented, although the press forming work entails such defects.

Additionally, the aforementioned fabrication machine for rack shaft is adapted such that by rotating the first roller 2, the forming portion 22 thereof is pressed into the surface portion of the steel pipe P and hence, a mechanism for vertically moving the first roller 2 or the steel pipe P is not required for pressing the first roller 2 into the surface portion of the steel pipe P. Thus, the structure of the machine is simplified and cost reduction results.

Figure 8:
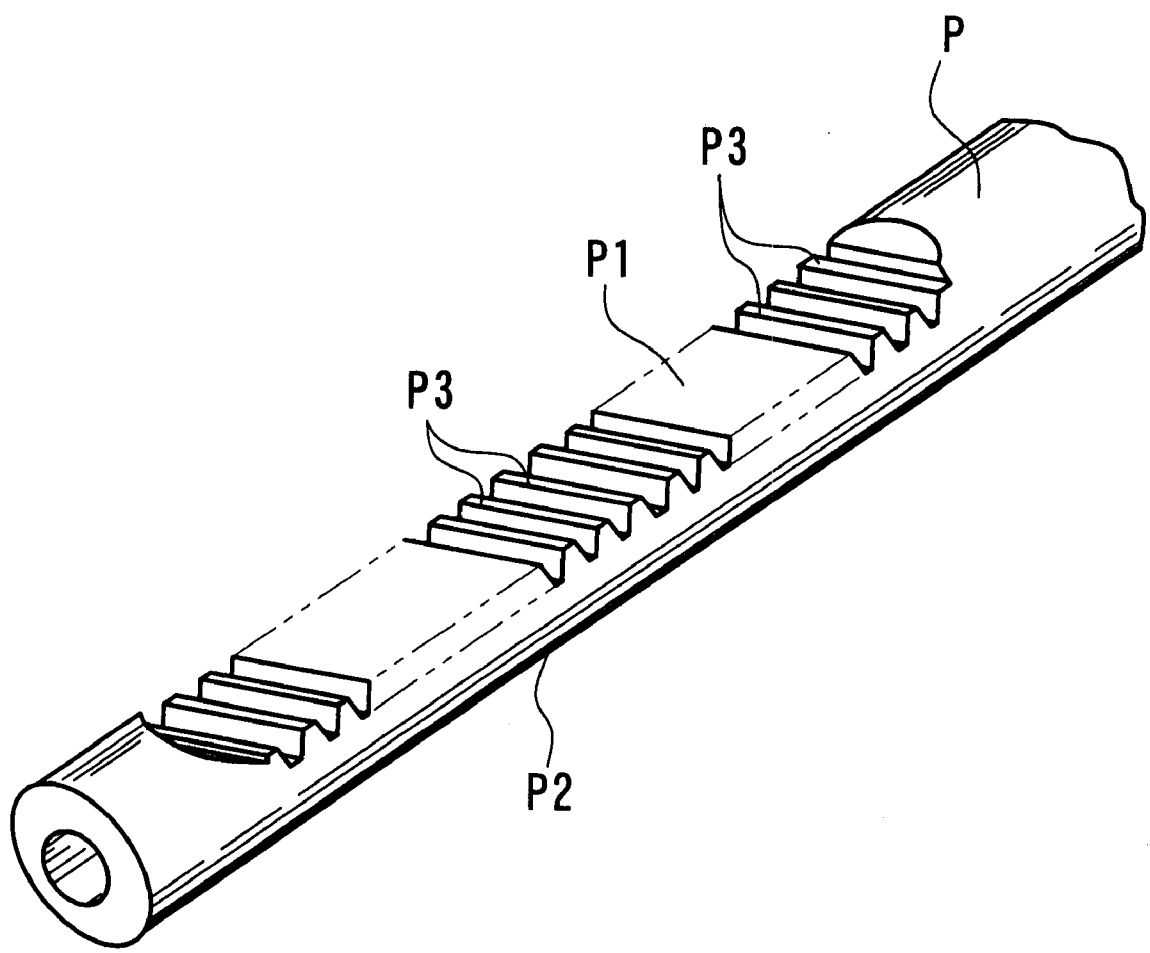
FIG. 8 is a perspective view showing a rack shaft.

Next, description will be made on a process for forming rack teeth P3, shown in FIG. 8, in the steel pipe P formed with the aforesaid flat portion P1.

Figure 9:
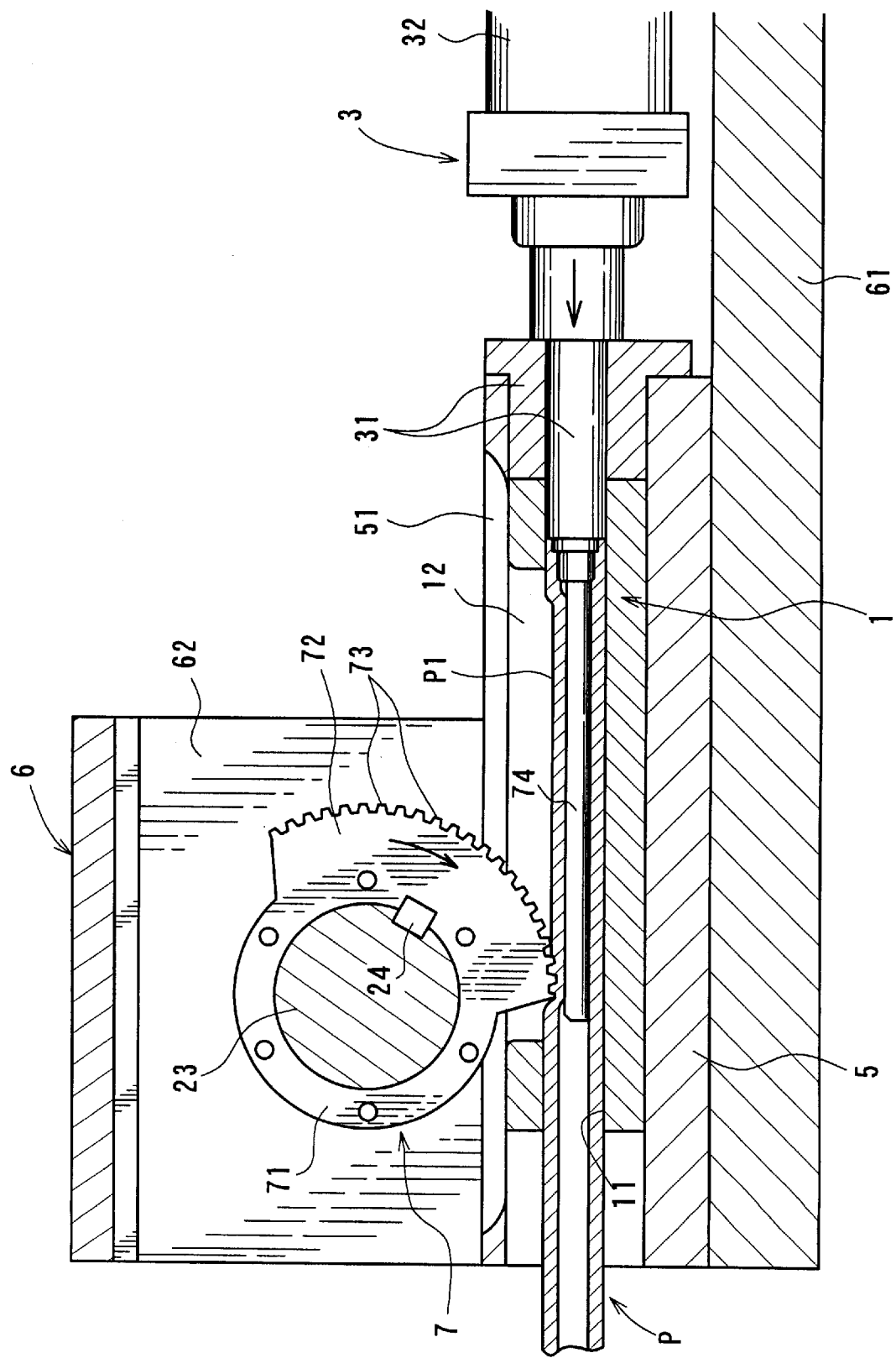
FIG. 9 is a vertical sectional view showing a state in which rack teeth are being formed.

The aforesaid fabrication machine for rack shaft is adapted to form the rack teeth P3 by replacing the first roller 2 for forming the flat portion with a second roller 7 for forming the rack teeth. As seen in FIG. 9, the second roller 7 includes an annular base portion 71 fitted around the support shaft 23 and a fan-like forming portion 72 protruding from an outer periphery of the base portion 71. An outer periphery of the forming portion 72 is formed with teeth 73 shaped in correspondence to the rack teeth P3.

Figure 10:
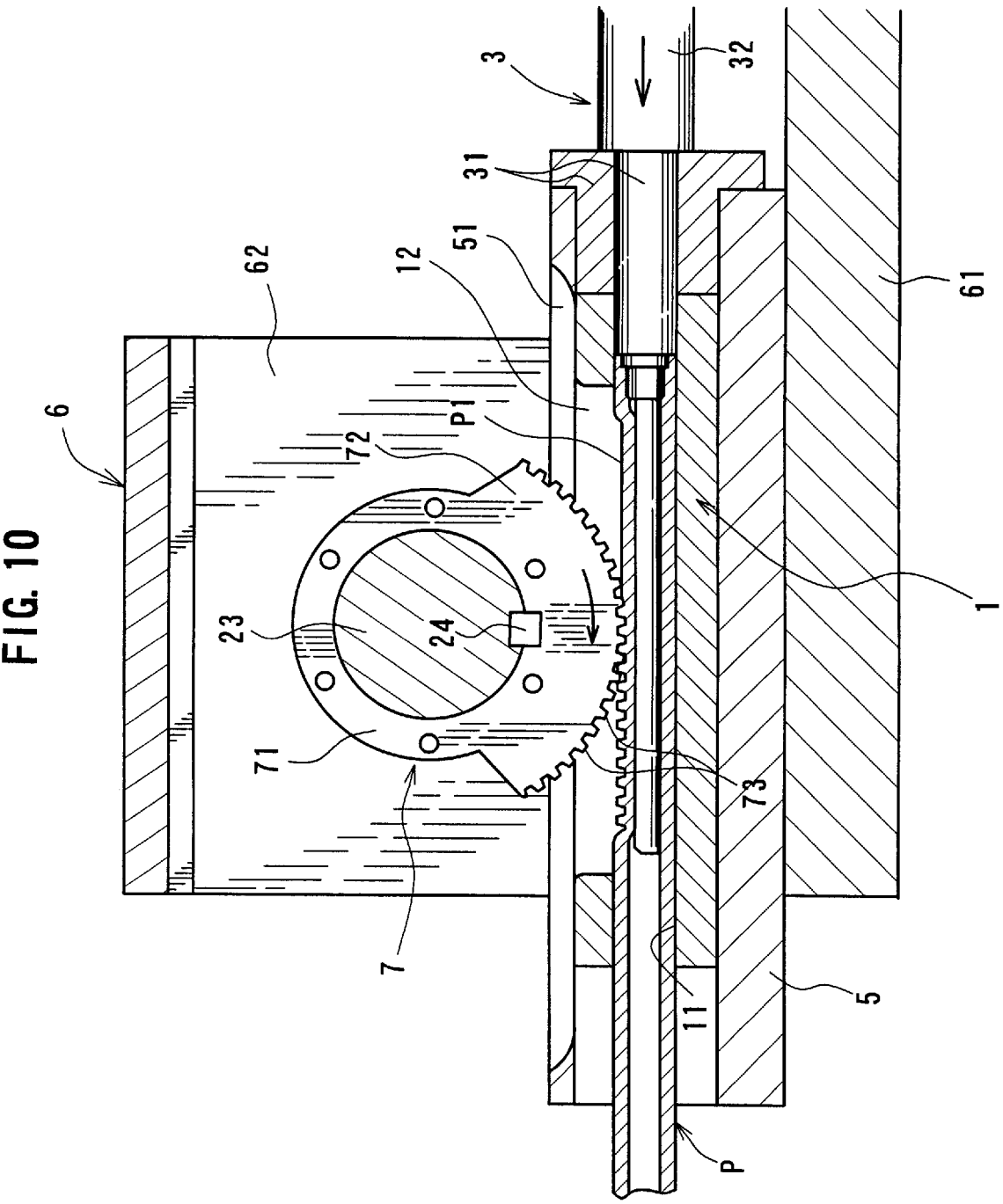
FIG. 10 is a vertical sectional view showing another state in which the rack teeth are being formed.

In order to form the rack teeth P3, with the retainer 1 moved to the home position, the steel pipe P formed with the flat portion P1 is inserted in the insertion hole 11 of the retainer 1 so as to be set in place. At this time, the flat portion P1 is oriented upward while a mandrel 74 is inserted in the steel pipe P to be placed over at least an interior portion thereof corresponding to the flat portion P1 for the purpose of receiving a load applied to the flat portion P1. Subsequently, the hydraulic cylinder 32 of the pusher 3 is driven so as to move the steel pipe P together with the retainer 1 and the slider 5 leftward as seen in FIG. 9. This allows the rotating second roller 7 to progressively cause the plastic deformation in the flat portion P1 of the steel pipe P by means of the teeth 73 of the second roller 7 (see FIG. 10). Thus is accomplished the forming of the rack teeth P3 in the flat portion P1.

Such formation of the rack teeth P3 by plastically deforming the flat portion P1 of the steel pipe P provides a high precision forming of the rack teeth P3 without being affected by a residual stress in the flat portion P1. That is, when the first roller 2 for forming the flat portion plastically deforms the flat portion P1 of the steel pipe P, the residual stress is produced in the flat portion P1. Accordingly, if the flat portion P1 is subject to a gear cutting work using a broaching cutter blade for forming the rack teeth P3, the precision of the rack teeth P3 is reduced because of an adverse effect of the aforesaid residual stress. However, when the second roller 7 is utilized for forming the rack teeth P3, the rack teeth P3 of high precision can be obtained without being affected by the residual stress. Further, if the high precision forming of the rack teeth P3 is to be accomplished by the aforesaid gear cutting work, there are needs for changing a profile of the broaching cutting blade, redesigning the jig and the like, thus resulting in an increased cost for forming the rack teeth P3. However, the formation of the rack teeth P3 by means of the second roller 7 advantageously circumvents the above problems.

Incidentally, the forming of the rack teeth P3 may be performed by cool working as well as by hot working.

Figure 11:
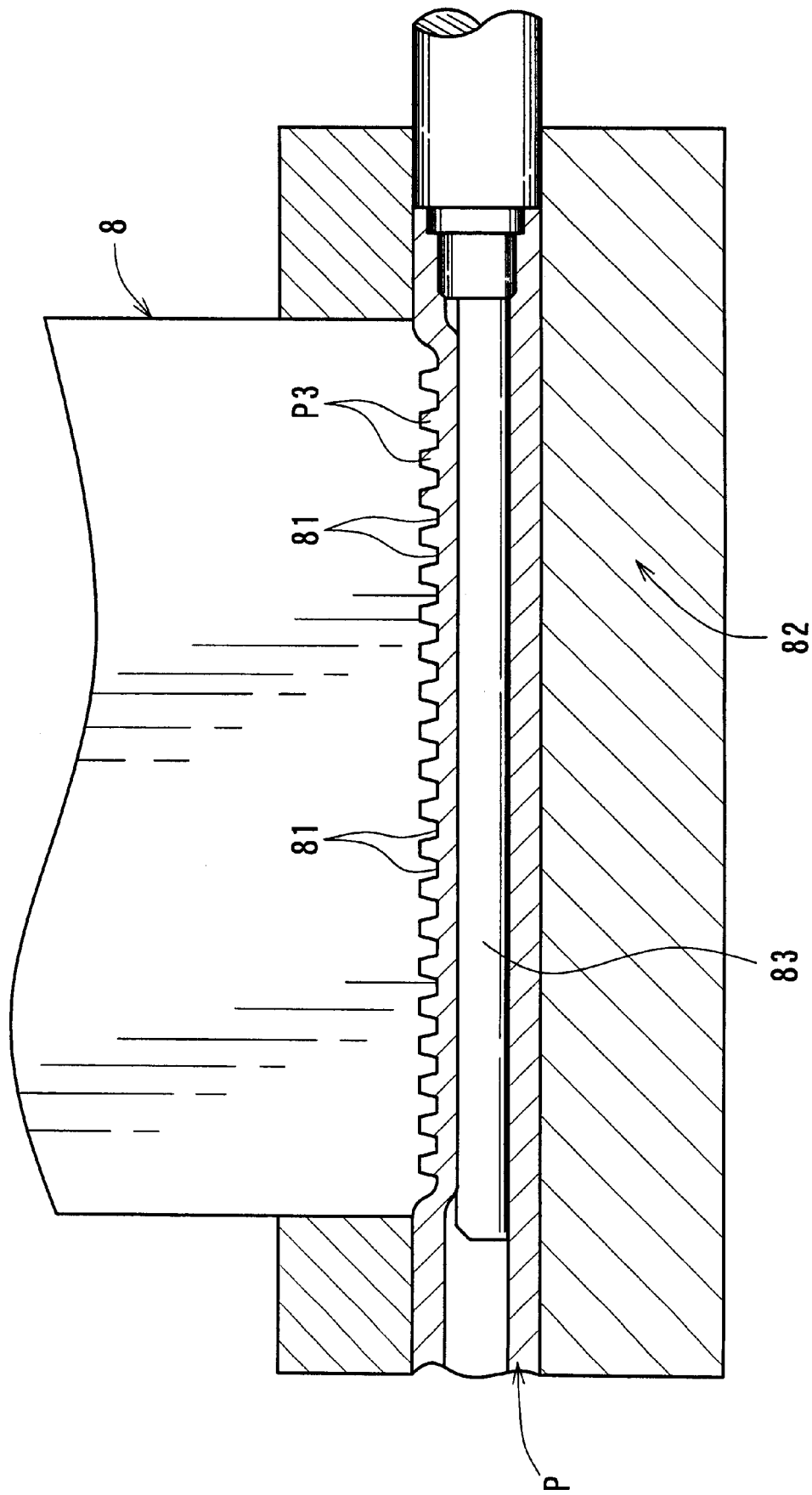
FIG. 11 is a vertical sectional view showing another forming process for the rack teeth.
Figure 12:
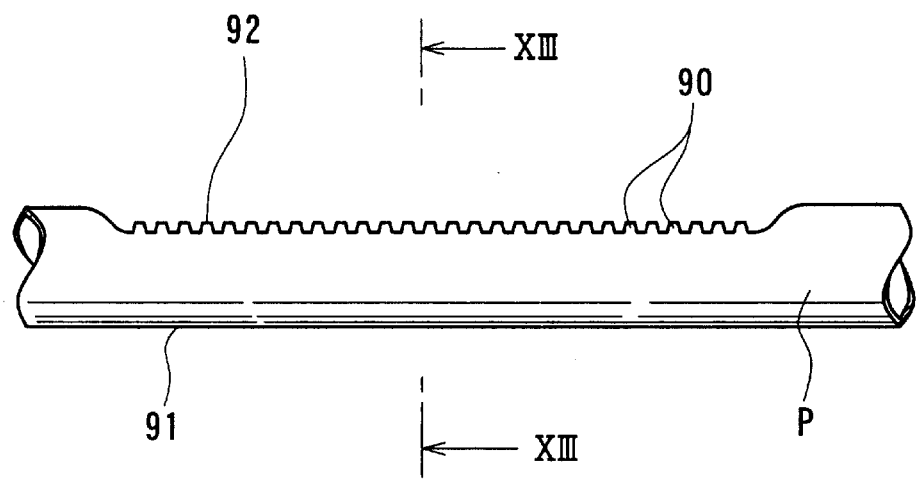
FIG. 12 is a front view showing the rack shaft.
Figure 13:
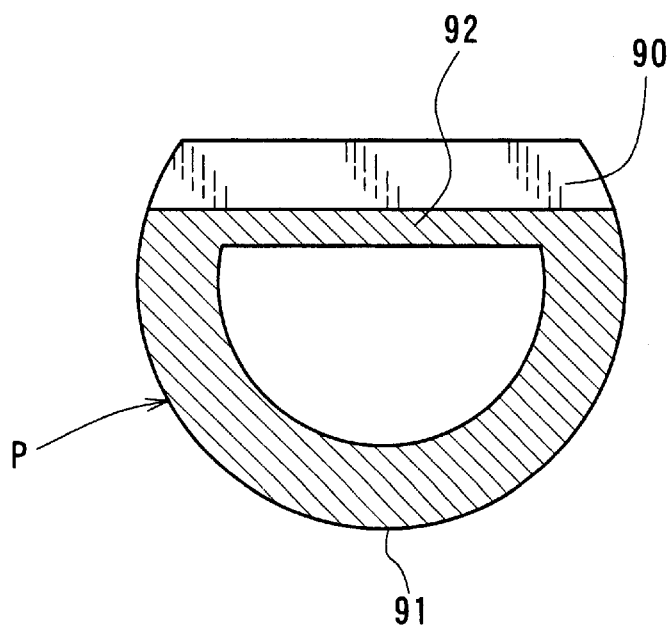
FIG. 13 is a sectional view taken on line XIII—XIII of FIG. 12.
Figure 14:
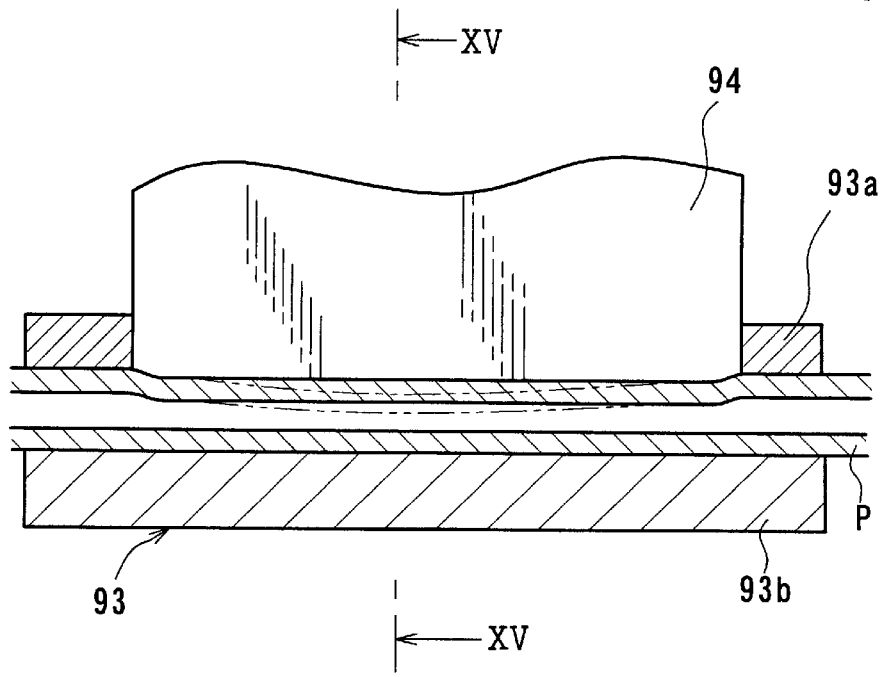
FIG. 14 is a vertical sectional view showing an example of the prior art.
Figure 15:
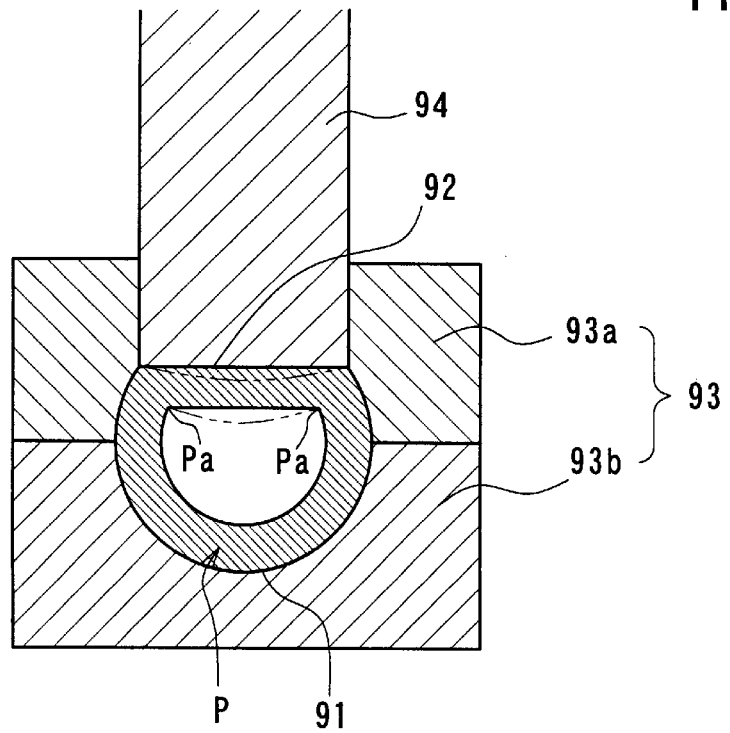
FIG. 15 is a sectional view taken on line XV—XV of FIG. 14.
Figure 16:
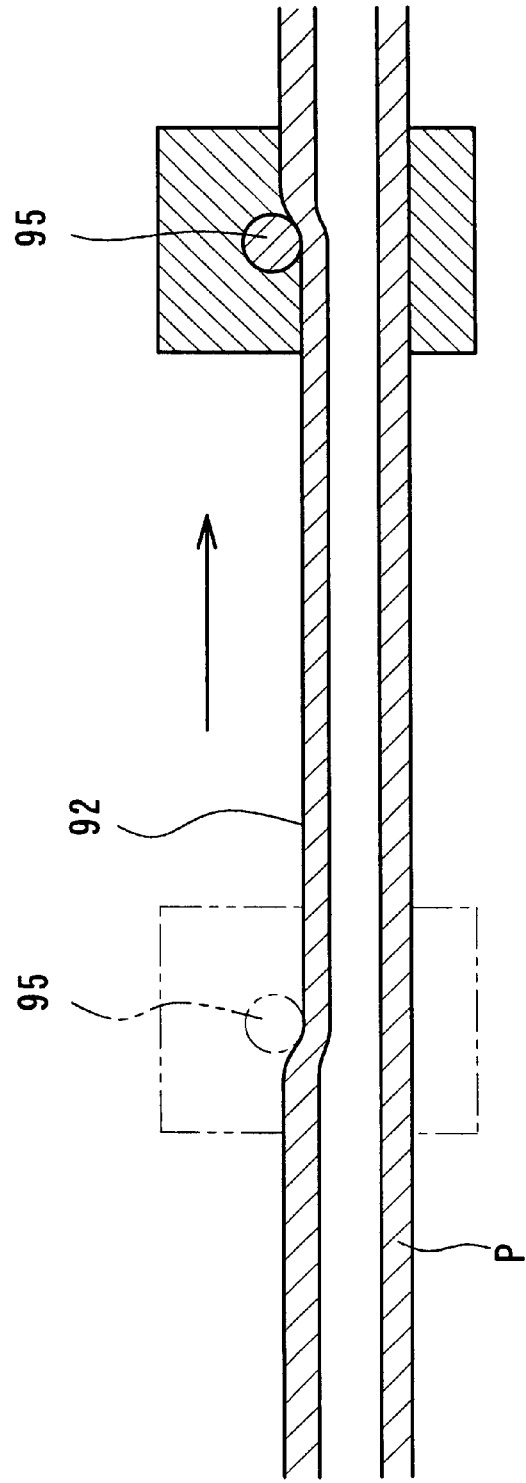
FIG. 16 is a vertical sectional view showing another example of the prior art.

FIG. 11 is an essential sectional view for illustrating a process for press forming the rack teeth P3. This embodiment employs a punch 8 formed with teeth 81 in line correspondingly to the rack teeth P3 as a die for forming the rack teeth. The steel pipe P is retained by a retainer die 82 while having a mandrel 83 inserted therein and placed over at least an interior portion thereof corresponding to the flat portion P1 for the purpose of receiving a load applied to the flat portion P1. In this state, the punch 8 is pressed against the flat portion P1 by a press machine so as to plastically deform the flat portion P1 and thus are obtained the rack teeth P3.

This embodiment also causes the flat portion P1 of the steel pipe P to be plastically deformed for formation of the rack teeth P3 and therefore, a high precision forming of the rack teeth P3 is accomplished without being affected by the residual stress in the flat portion P1. Furthermore, the embodiment features a lower working cost than forming of the rack teeth by gear cutting work.

Incidentally, the forming of the rack teeth P3 may be performed by cool working as well as hot working.

The aforesaid fabrication machine for rack shaft may be arranged such that the first roller 2 is relatively movable to the steel pipe P and caused to move along the steel pipe P by the pusher. In this case, the hydraulic cylinder may serve as the drive source for pushing the first roller 2. Otherwise, an oil hydraulic motor or a geared motor may serve as the drive source for rotating the support shaft 23 or the pinion 42.

It should be appreciated that the present invention may be practiced in other various forms without departing from the spirit or essential features of the invention. Every aspect of the description of the foregoing embodiments is for illustrative purpose only and therefore, should not be construed as restrictive.

What is claimed is:

1. A process for fabrication of a pipe into a work piece which with subsequent machining can be formed into a rack shaft, said process comprising the steps of:
   a. providing a linear metal pipe having a lengthwise extending axial passageway and an axis and which is mounted on a retainer mounted for reciprocation for effecting axial movement of the linear metal pipe;
   b. providing a working roller mounted for rotation about an axis of rotation perpendicular to the axis of said metal pipe and having an outer surface including an arcuate forming smooth surface portion outwardly spaced from said axis of rotation; and
   c. moving said retainer to effect axial movement of the pipe by power drive means while simultaneously rotating said working roller by said power drive means in synchronization with the axial movement of said pipe so that the forming portion of said roller moves at the same speed as the pipe and engages the outer surface of the pipe to deform a portion of the pipe inwardly to provide a flat pipe surface extending along the length of said pipe to create said work piece.

2. A process as recited in claim 1, including the further steps of:
   d. positioning a mandrel internally of said work piece which fills the axial opening in the pipe beneath the flat pipe surface.
   e. providing a second roller for rotation about said axis of rotation perpendicular to the axis of said work piece having an arcuate fan-like portion with spaced teeth on an arcuate outer periphery; and
   f. moving said work piece axially by said power drive means while simultaneously rotating said second roller by said power drive means in synchronization with the axial movement of said work piece so that said teeth move at the same speed as the work piece and engage the flat surface of the work piece to deform portions of the flat surface inwardly and creates rack teeth separated by said deformed positions so as to create a rack.

3. A process as recited in claim 1, including the further steps of:
   g. positioning a mandrel internally of said work piece which extends pipe beneath and engages the flat pipe surface;
   h. providing a punch mounted for vertical movement perpendicular to said axis and above said flat surface of said work piece and having teeth on its lower end facing said flat surface; and
   i. moving said punch teeth into contact with said flat surface with sufficient force to effect forming of rack teeth by deformation of said flat surface.

4. A fabrication machine for forming a work piece from a pipe comprising:
   a pipe retainer mounted for movement along a linear path while retaining a pipe having a circular sectional form and an axis parallel to said linear path;
   a roller having an outer surface and positioned adjacent said linear path for rotation about an axis spaced from and perpendicular to said linear path;
   power drive means moving said pipe retainer and a pipe retained on said pipe retainer along said linear path and for drivingly rotating said roller so that the roller outer surface moves at the same speed as the pipe and engages the pipe so that a part of said pipe is plastically deformed by said roller into a flat portion while said roller is maintained in non-slip rolling contact with said pipe.

5. A fabrication machine for forming a work piece as set forth in claim 4, wherein said power drive means includes a hydraulic cylinder having a piston rod connected to said pipe retainer, a rack fixedly connected to said retainer and oriented parallel to the axis of said steel pipe, and a pinion coupled to said first roller for integral rotation therewith and meshed with said rack.

6. A fabrication machine as set forth in claim 5, wherein said roller includes a base portion fitted around a support shaft, and a fan-like forming portion protruding from an outer periphery of said base portion and having a circumferential length substantially equal to the overall length of the flat portion.

7. A fabrication machine as set forth in claim 4, wherein said roller includes a base portion fitted around a support shaft, and a fan-like forming portion protruding from an outer periphery of said base portion and having a circumferential length substantially equal to the overall length of the flat portion.

* * * * *